(12) United States Patent
Devaux et al.

(10) Patent No.: US 10,669,011 B2
(45) Date of Patent: Jun. 2, 2020

(54) ROTATING FRONT PART OF AN AIRCRAFT TURBOMACHINE INTAKE, OF IMPROVED DESIGN PERMITTING REPEATED REMOVAL OF THE CONE TIP

(71) Applicant: SAFRAN AIRCRAFT ENGINES, Paris (FR)

(72) Inventors: Sylvie Judith Devaux, Maisons-Alfort (FR); Pierre Yves Heinry, Morsang sur Orge (FR); Olivier Richard Lefebvre, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 77 days.

(21) Appl. No.: 16/098,528

(22) PCT Filed: May 9, 2017

(86) PCT No.: PCT/FR2017/051098
§ 371 (c)(1),
(2) Date: Nov. 2, 2018

(87) PCT Pub. No.: WO2017/194866
PCT Pub. Date: Nov. 16, 2017

(65) Prior Publication Data
US 2019/0127045 A1    May 2, 2019

(30) Foreign Application Priority Data
May 10, 2016   (FR) ........................................ 16 54156

(51) Int. Cl.
*B64C 11/14*   (2006.01)
*F02C 7/04*    (2006.01)

(52) U.S. Cl.
CPC ................ *B64C 11/14* (2013.01); *F02C 7/04* (2013.01); *F05D 2260/31* (2013.01); *F05D 2260/36* (2013.01); *F05D 2260/37* (2013.01)

(58) Field of Classification Search
CPC ........ B64C 11/14; F02C 7/04; F05D 2260/31; F05D 2260/36; F05D 2260/37; F01D 25/00; F04D 29/58
See application file for complete search history.

(56) References Cited

U.S. PATENT DOCUMENTS 2,401,247 A * 5/1946 Hunter .................... B64C 11/14
                                                244/134 A
4,863,354 A * 9/1989 Asselin ................... B64C 11/14
                                                416/245 R (Continued)

FOREIGN PATENT DOCUMENTS

| EP | 1970537 A1 | 9/2008 |
| FR | 2921422 A1 | 3/2009 |
| FR | 2943725 A1 | 10/2010 |

OTHER PUBLICATIONS

Search Report issued in French Patent Application No. 1654156 dated Jan. 12, 2017.

(Continued)

*Primary Examiner* — Richard A Edgar
*Assistant Examiner* — Joshua R Beebe
(74) *Attorney, Agent, or Firm* — Pearne & Gordon LLP

(57) ABSTRACT

The invention relates to a rotating front part of an aircraft turbomachine intake comprising bolts for attaching a cone tip to an internal support, each bolt comprising a rear end that is screwed into the support and a front end that receives a clamping nut, a rotation-prevention portion of non-circular cross section of each bolt engaging with a hole of corresponding cross section of a rotation-prevention ring. Also provided are extraction bolts, of which a rear end is screwed (Continued)

into the filling piece, each bolt passing through a cone tip flange. Finally, the invention is configured such that, after removal of the nuts, forward tension on the bolts allows the removal of an assembly comprising the tip and the filling piece, while keeping the bolts screwed to the support.

10 Claims, 6 Drawing Sheets

(56) References Cited

U.S. PATENT DOCUMENTS

| | | | |
|---|---|---|---|
| 6,416,280 B1 * | 7/2002 | Forrester | B64C 11/14 |
| | | | 416/94 |
| 6,447,255 B1 * | 9/2002 | Bagnall | F01D 5/066 |
| | | | 277/626 |
| 7,303,377 B2 * | 12/2007 | Rockarts | F01D 5/027 |
| | | | 416/144 |
| 8,246,310 B2 * | 8/2012 | Pierrot | F04D 29/321 |
| | | | 416/220 R |
| 8,425,197 B2 * | 4/2013 | Breakwell | F02C 7/04 |
| | | | 416/245 R |
| 2010/0226786 A1 | 9/2010 | Mahan | |

OTHER PUBLICATIONS

International Search Report issued in Application No. PCT/FR2017/051098 dated Aug. 30, 2017.

Written Opinion issued in Application No. PCT/FR2017/051098 dated Aug. 30, 2017.

\* cited by examiner

ROTATING FRONT PART OF AN AIRCRAFT TURBOMACHINE INTAKE, OF IMPROVED DESIGN PERMITTING REPEATED REMOVAL OF THE CONE TIP

This is the National Stage application of PCT international application PCT/FR2017/051098, filed on May 9, 2017 entitled "ROTATING FRONT PART OF AN AIRCRAFT TURBOMACHINE INTAKE, OF IMPROVED DESIGN PERMITTING REPEATED REMOVAL OF THE CONE TIP", which claims the priority of French Patent Application No. 16 54156 filed May 10, 2016, both of which are incorporated herein by reference in their entirety.

TECHNICAL FIELD

The present invention relates to the field of aircraft turbomachines, and in particular to their receivers, such as for example the fan of a turbojet.

It applies in particular to the design of the exterior front cone and of its environment, and more precisely to the design of attachment means of a cone tip on an interior support bearing turbomachine equipment.

PRIOR ART

Conventionally, the fan of a turbojet includes an exterior front cone situated upstream of the rotating blades of the fan, as is known for example from document FR 2 943 725. The same is true for a propeller of a turboprop, which also comprises this same type of aerodynamically shaped exterior front cone.

In certain cases, the exterior front cone can be equipped at its front end with a removable cone tip, attached to an interior support bearing some type of equipment, such as a transmitting antenna of a telemetry device, additionally equipped with one or more batteries. In this particular case, an equipment protection hood is interleaved between the cone tip and the interior support.

In certain circumstances, particularly during the test phase of the turbomachine, access to the equipment must be frequent. In the example offered above, the batteries must be regularly recharged during this test phase, every day for example. Attachment means for the cone tip are therefore provided which, once withdrawn, allow the extraction of this cone tip, then access to the equipment protection hood. More precisely, to withdraw the cone tip, provision is made to initially install an extraction block between a protection hood flange and a cone tip flange. Consequently, once the attachment means are withdrawn, it is sufficient to mount suitable tooling on the extraction block to move it forward so that it takes the cone tip with it. Once the extraction is accomplished, the operator then has access to the protection hood, on which he can for example install tooling for recharging the batteries.

The aforementioned attachment means take the form of screws in which the head is oriented forward, and of which the threaded shank cooperates at its rear end with the interior support. More precisely, self-locking threads are provided, applied in the openings of the interior support. These threads have as their function to prevent loosening of the screws turning with the rest of the fan and subjected to a vibrating environment.

However, self-locking threads have a tendency to lose their self-locking capacity after several assembly/disassembly cycles of the attachment screws, for example after a series of five to ten cycles. Given that the locking of the screws is an indispensable function in the vibrating environment to which they are subjected, self-locking threads must be regularly replaced. These replacement operations require specific tooling, as well as the prior disassembly of the protection hood from the equipment that it covers, and of the interior support. The time devoted to the implementation of all these operations can sometimes prove incompatible with scheduling and aircraft grounding constraints.

This disadvantage is all the more problematical when the withdrawal of the cone tip must be carried out very regularly, daily for example, as is the case for the requirement to recharge the batteries during a test phase of the turbomachine. Nevertheless, as indicated above, this problem exists regardless of the nature of the on-board equipment.

DISCLOSURE OF THE INVENTION

To respond at least partially to the above problems related to the accomplishments of the prior art, the invention has as its primary object a rotating front portion of a receiver of an aircraft turbomachine comprising:
- an interior support;
- equipment mounted on the interior support;
- a protection hood covering the equipment;
- an exterior front cone equipped at its front end with a cone tip covering the protection hood;
- an extraction block interleaved between a protection hood flange and a cone tip flange; and
- attachment means of the cone tip to the interior support, said attachment means passing through the cone tip flange, the extraction block, and the protection hood flange.

According to the invention, said attachment means comprise several attachment stud bolts, of which a threaded rear end is screwed into said interior support and of which a threaded front end receives a clamping nut seeking to force the cone tip flange in the direction of the interior support, said attachment means also comprising, arranged axially between the interior support and the cone tip flange, a ring for blocking rotation of the attachment stud bolts, each of the latter having an anti-rotation portion with a non-circular section cooperating with a bore of corresponding section of the rotation blocking ring.

Moreover, the front portion also includes a plurality of extraction stud bolts, of which a threaded rear end is screwed into the extraction block, each extraction stud bolt passing through the cone tip flange, said front portion being configured so that after withdrawal of said clamping nuts, a traction toward the front on the extraction stud bolts allows the withdrawal of a removable assembly, comprising the cone tip and the extraction block, while retaining the attachment stud bolts screwed to the interior support.

The design proposed by the present invention simplifies the extraction operations of the cone tip, in particular by allowing the attachment stud bolts to be left permanently on the interior support, during these extraction operations seeking to give access to the protection hood covering the equipment. Moreover, because the attachment stud bolts remain permanently on the interior support, it is consequently no longer necessary to implement constraining operations for replacing possible self-locking threads present on the attachment stud bolts.

The proposed solution thus allows frequent extractions of the cone tip to be considered, while still satisfying the various constraints of scheduling and of the duration of aircraft grounding.

Furthermore, the invention has at least one of the following optional features, taken in isolation or in combination.

The anti-rotation portion of each attachment stud bolt has a section comprising two parallel straight segments, and the associated bore performed through the rotation blocking ring has an oblong shape, of which the two parallel lateral flanks cooperate respectively with the two straight segments of the anti-rotation portion of the attachment stud bolt. The oblong shape advantageously contributes a tolerance in the relative positioning between the anti-rotation portion of the attachment stud bolt and the bore, while still providing the desired function of blocking rotation.

In this particular case, it is provided that the anti-rotation portion of each attachment stud bolt has for example a section of polygonal shape, preferably hexagonal.

The attachment means include three attachment stud bolts, and the three bores of oblong shape are oriented:
  for two of them, substantially tangentially with respect to an axis of rotation of the front portion; and
  for the third bore, substantially radially with respect to the axis of rotation of the front portion.

This particular assembly allows limiting the assembly problems in the case where the bores of the rotation blocking ring are not perfectly indexed with the openings of the interior support receiving the attachment stud bolts. Consequently, assembly remains possible even without resorting to tight manufacturing tolerances on the part concerned.

Preferably, the three bores are arranged at 120° from one another.

The extraction stud bolts comprise a threaded front end receiving a nut pressing a sealing washer against the cone tip flange, and the clamping nuts screwed to the attachment stud bolts also press a sealing washer each against the cone tip flange. The washers thus make it possible to provide the sealing function between the equipment and the exterior environment.

The threaded rear end of each extraction stud bolt is blocked in rotation in a threaded opening of the extraction block, by means of a shrink-fit pin oriented along a screwing axis and arranged at the interface between the threaded rear end of the extraction stud bolt and the threaded opening of the extraction block. This is a solution that is simple to implementing the desired result of blocking in rotation of each extraction stud bolt to be achieved in its corresponding threaded opening of the extraction block.

Moreover, just as with the other elements of the invention, this shrink-fit pin solution is simple to implement on existing receivers, without necessitating substantial modifications on original parts.

The equipment covered by the protection hood and mounted on the support corresponds to a transmitting antenna of a telemetry device also equipped with at least one battery, and preferably equipped with several batteries, six for example. Nevertheless, it could relate to any other type of equipment without departing from the scope of the invention.

Preferably, the cone tip is made in two axially successive adjoining parts. Nevertheless, it could be single part, made in one piece or from several different assembled elements attached fixedly to one another.

The invention also has as its object an aircraft turbomachine comprising a receiver of which the rotating front portion appears as described above, the receiver preferably being a fan.

Finally, the invention has as its object a disassembly method of the rotating front portion described above, said method aiming to provide access to the protection hood covering the equipment, and comprising the following steps:
  withdrawal of the clamping nuts present on the threaded front end of the attachment stud bolts; then
  forward displacement of the extraction stud bolts so as to withdraw the assembly comprising the cone tip and the extraction block, a withdrawal during which the attachment stud bolts, which remain attached to said interior support, slide relative to the cone tip flange and to the extraction block.

Other advantages and features of the invention will appear in the non-limiting detailed description below.

BRIEF DESCRIPTION OF THE DRAWINGS

This description will be made with reference to the appended drawings, in which.

DETAILED DISCLOSURE OF PREFERRED EMBODIMENTS

Figure 1:
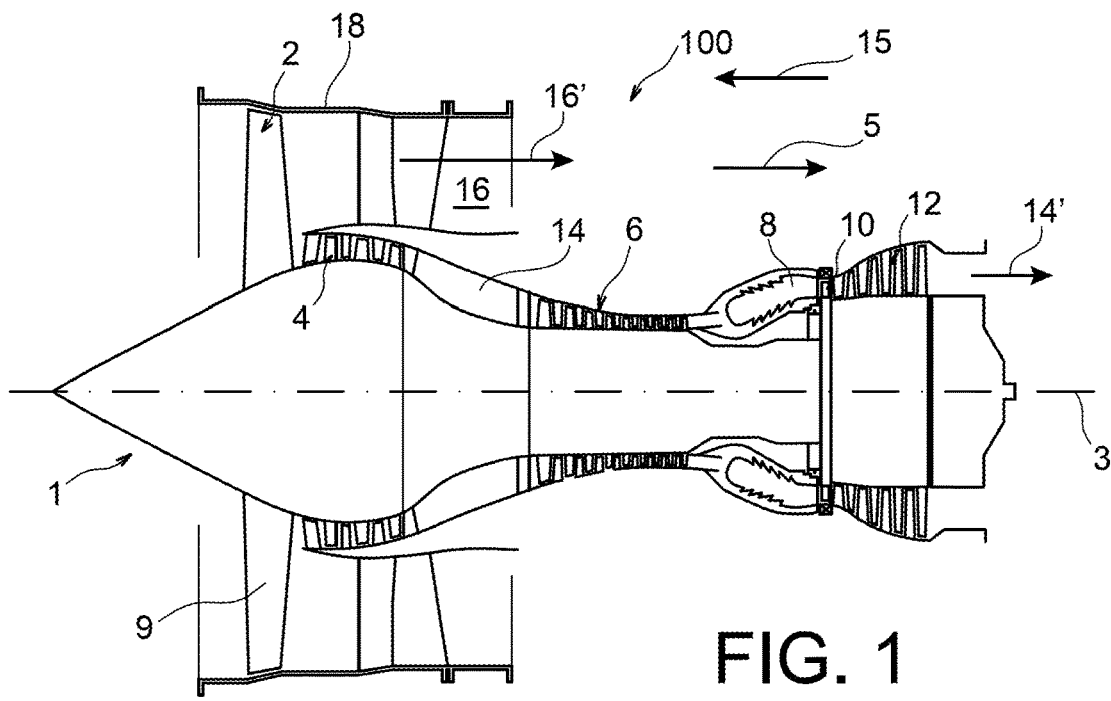
FIG. 1 shows a schematic view of a turbojet according to the invention, in longitudinal section.
Figure 2:
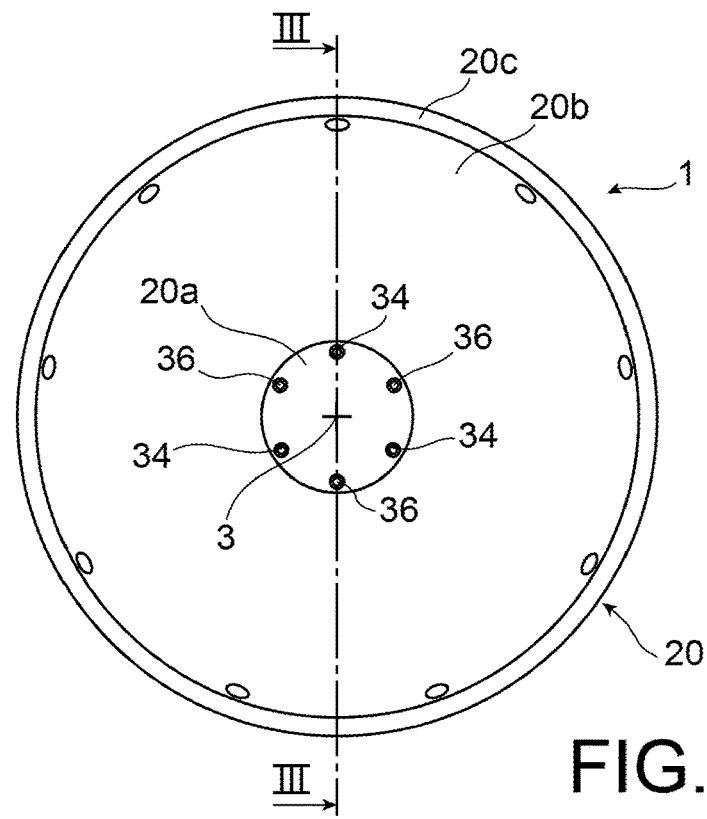
FIG. 2 shows a front view of the turbojet, showing the rotation front portion which appears in the form of a preferred embodiment of the invention.
Figure 3:
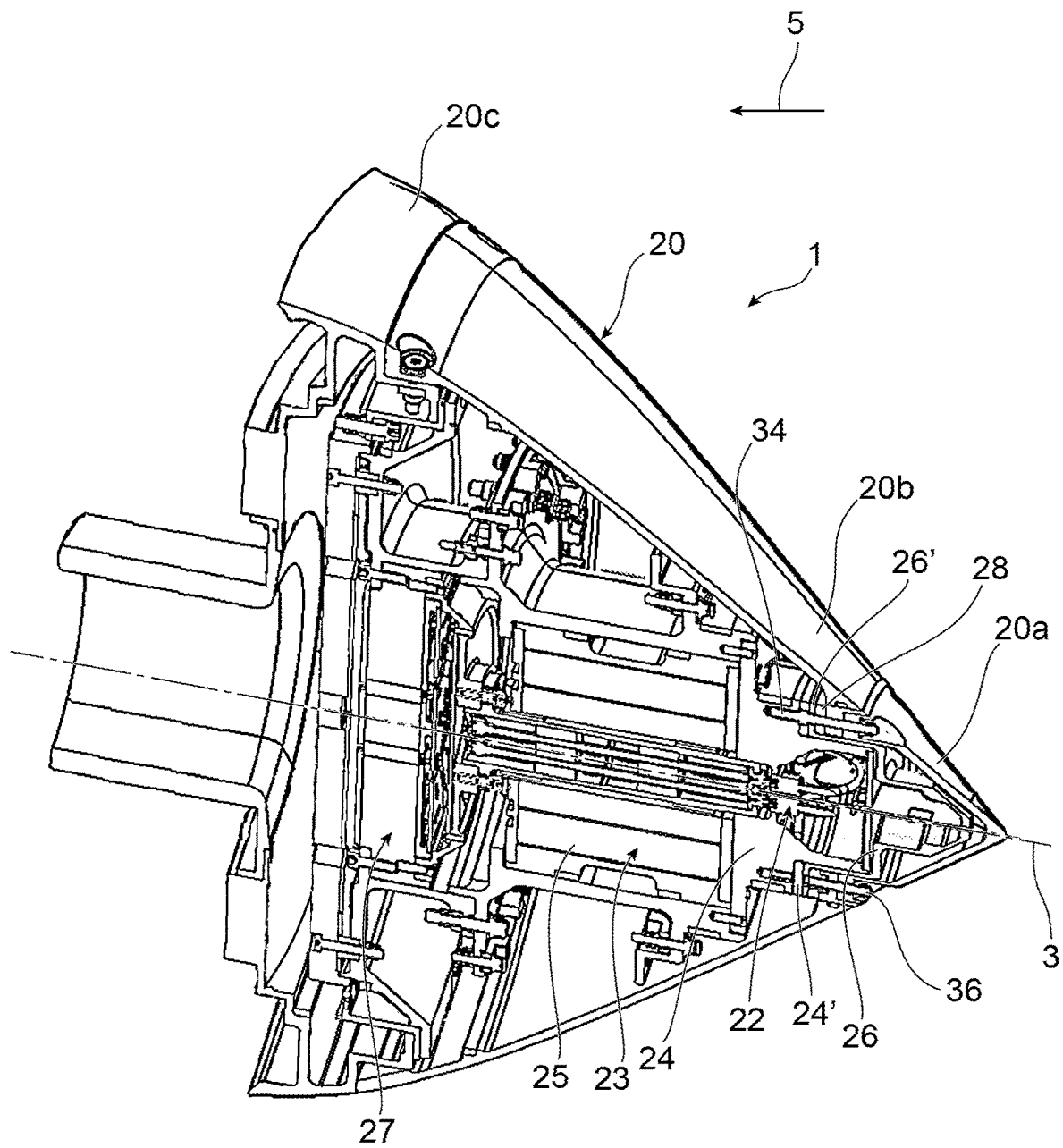
FIG. 3 shows a perspective view of the rotation front portion, coupled along line III-III of FIG. 2.

With reference, first of all, to FIG. 1, an aircraft turbomachine 100 is shown, designed to integrate a rotation front portion 1 according to the invention. Here this is a two-shaft turbofan. Nevertheless, it could be a turbomachine of another type, for example a turboprop, without departing from the scope of the invention.

The turbomachine 100 has a longitudinal axis 3 around which the different components extend. It comprises, from upstream to downstream in a principal direction 5 of gas flow through this turbomachine, a fan 2, a low-pressure compressor 4, a high-pressure compressor 6, a combustion chamber 8, a high-pressure turbine 10 and a low-pressure turbine 12. These elements delimit a primary flow path 14 through which passes a primary flow 14', while a secondary flow path 16 surrounds the primary flow path by being partially delimited by a fan casing 18 and has a secondary air flow 16' passing through it.

The fan 2, which corresponds to the receiver of the turbomachine 100, comprises at its upstream end the rotation front portion 1 according to the invention. This front portion 1, which is located downstream of the fan blades 9, will be described hereafter in detail with reference to the following figures.

In the description that follows, the terms 'front' and "rear" are considered according to a direction 15 opposite to the principal direction 5 of gas flow within the turbojet, and parallel to the axis 3. However, the terms "upstream" and "downstream" are considered according to this same principal flow direction 5.

With reference to FIGS. 2 to 6, the rotating front portion 1 of the fan is shown, which comprises an exterior shell in the form of a cone with axis 3. This cone, called the exterior front cone 20, has an aerodynamic exterior surface designed for the air to conform to it before it passes through the fan blades. It is for example divided into three axially successive sections, namely a cone tip 20a, a central section 20b and a rear section 20c.

The cone tip 20a is situated at the front end of the portion 1, and extends axially over a short length with respect to the total axial length of the cone 20, for example over only 10 to 20% thereof.

The exterior front cone 20 is hollow and integrates several elements of this same cone, integral in rotation. This is, first of all, equipment 22, here a transmitting antenna of a telemetry device 23 equipped with batteries 25 and with a data acquisition system 27. The device 23 is thus capable of collecting data during test phases of the turbomachine, then transfer them in real time to a fixed point exterior to the turbomachine via the antenna 22. By way of illustrative examples, the data collected are of the dynamic strain gauge and thermocouple type, measured by sensors judiciously placed within the turbomachine.

The equipment 22 is mounted on an interior support 24 of the front portion 1, this support 24 being centered on the axis 3. The interior support 24 is essentially surrounded radially by the principal central section 20b of the cone 20 and, at its front end, surrounded by a rear portion of the cone tip 20a.

At its front end, the equipment 22 is covered axially and radially by a protection hood 26, with a generally conical shape and centered on the axis 3. This same hood 26, corresponding preferably to an antenna hood, is covered axially and radially essentially by the cone tip 20a of the cone 20 and, at its rear end, covered by the principal central section 20b of this cone 20.

The protection hood 26 comprises a flange 26' for its attachment to the rotation portion 1, and more precisely to the interior support 24 having a shoulder 24' aligned axially with the flange 26' along the axis 3.

The rotating front portion 1 also includes a substantially annular extraction block 28, with axis 3. This block 28 includes, alternating in the circumferential direction, passage hoes 30 and threaded holes 32. The extraction block 28 is clamped axially between the flange 26' of the protection hood 26, and an attachment flange 20a' of the front point 20a. In this regard, it is indicated that the front point 20a could be produced in a single part, or made of two adjoining parts 20a1, 20a2 in axial succession and interlocked with one another, as was shown in the figures. For reasons of simplicity and clarity of the description, hereafter the cone tip 20a will be considered to be the same single entity.

The rotating portion 1 also includes attachment stud bolts 34 as well as extraction stud bolts 36, arranged alternately and regularly spaced around the axis 3. As has been illustrated in FIG. 2, these are preferably three attachment stud bolts 34 at 120° from one another, and three extraction stud bolts 36 also arranged at 120° from one another.

Figure 4:
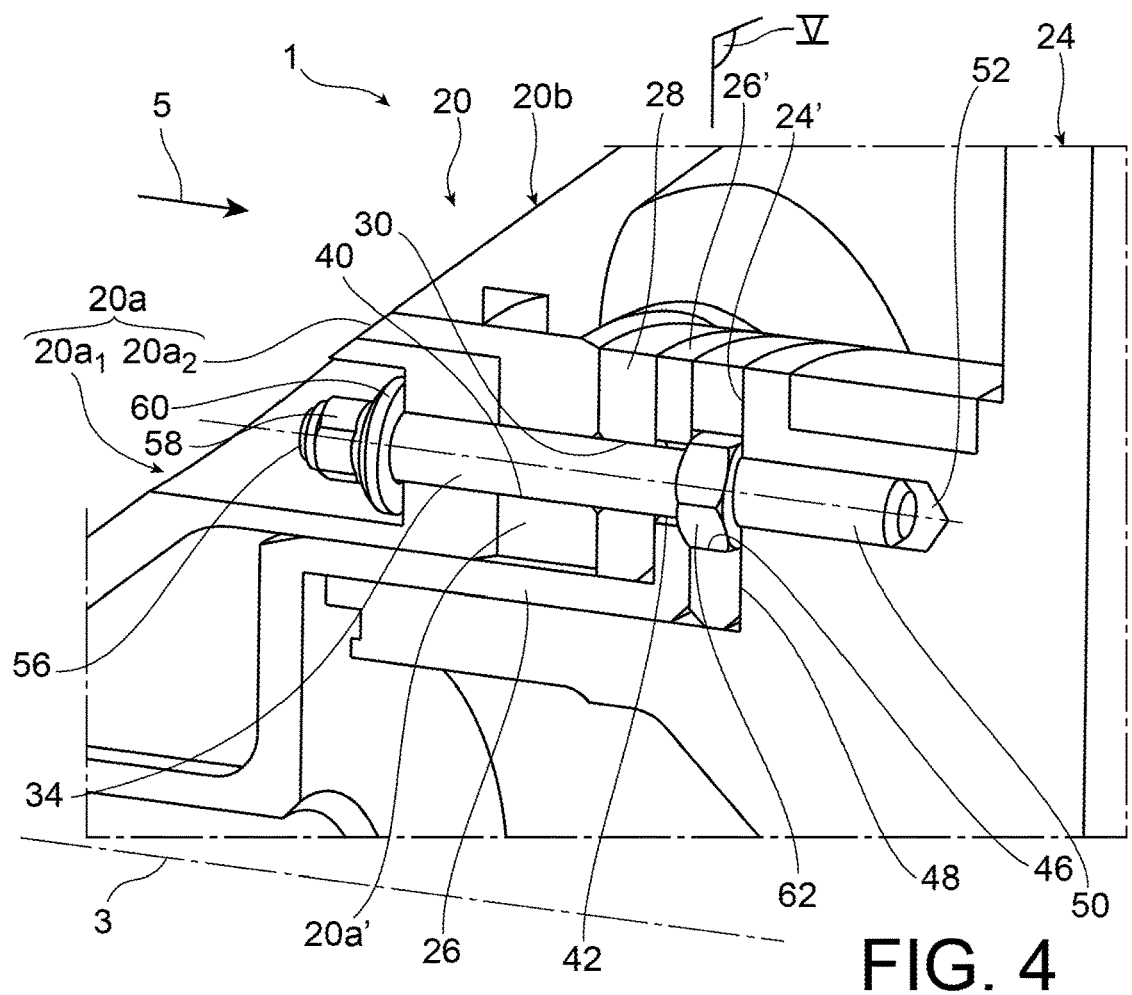
FIG. 4 is a partial and enlarged view of that shown in FIG. 3, showing more specifically the attachment means of a cone tip on an interior support of the rotation front portion.

With reference more specifically to FIG. 4, each attachment stud bolt 34 is arranged substantially axially, and passes successively through, from front to rear, a passage hole 40 in the attachment flange 20a' of the cone tip, a passage hole 30 of the extraction block 28, a passage hole 42 in the attachment flange 26' of the protection hood 26, and through a bore 46 of a rotation blocking ring 48 of the attachment stud bolt 34.

On either side of the passing element described above, each stud bolt 34 comprises a threaded rear end 50 screwed into a threaded opening 52 of the interior support 24, and a front threaded end 56 receiving a clamping nut 58 seeking to force the flange 20a' of the cone tip in the direction of the interior support 24. Moreover, a sealing washer 60 is interleaved axially between the nut 58 and the flange 20a', this washer therefore blocking in a sealing manner the passage hole 40.

Preferably, each clamping nut 58 has a locking function to satisfy the constraints encountered in the vibratory environment to which it is subjected. Self-locking threads can have a tendency to lose their locking capacity after several assembly/disassembly cycles of the nuts 58, but these can be easily change when this proves necessary.

Likewise, self-locking threads are preferably retained at the threaded rear end 50 of the attachment stud bolts 34.

Figure 5:
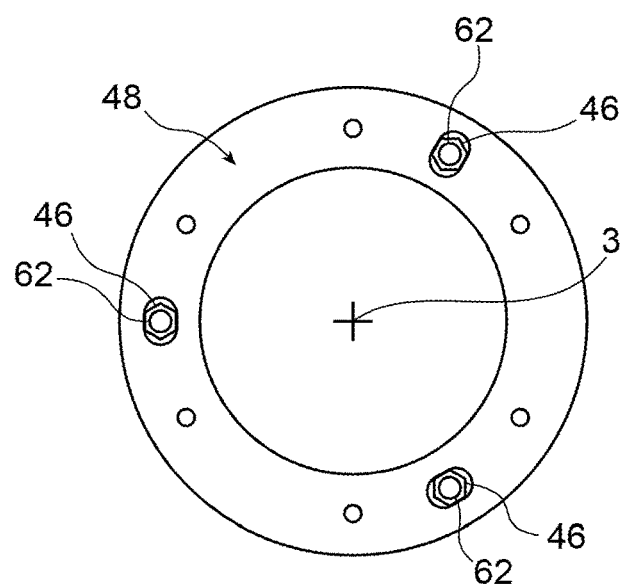
FIG. 5 is a section view taken along plane V of FIG. 4.

The ring 48 is clamped axially between the flange 26' of the protection hood 26 and the shoulder 24' of the interior support 24. It is shown enlarged in FIG. 5, showing the three bores 46 spaced at 120° from one another, and coinciding with the position of the three attachment stud bolts. Each bore 46 has an oblong shape, in which the two the lateral flanks cooperate respectively with two straight segments of an anti-rotation portion 62 of the associated attachment stud bolt 34. More preferably, the anti-rotation portion 62 has a section of hexagonal shape, which corresponds to a shape complementary to that of the oblong bore 46 given that the two parallel lateral flanks thereof cooperate respectively with two opposite straight segments of the hexagonal section of the anti-rotation portion 62. Only a slight clearance can be provided between the plane surfaces facing each other two by two, guaranteeing the anti-rotation function of the stud bolt 34 along its own longitudinal axis. Consequently, the risks that the attachment stud bolts will unscrew are advantageously reduced to zero.

To facilitate the installation of the stud bolts 34 through the bores 46 and into the threaded openings 52 of the interior support 24, two of the bores 46 are oriented substantially tangentially with respect to the axis 3, also corresponding to the axis of rotation of the rotation front portion 1, while the third bore is oriented substantially radially with respect to the same axis 3. This allows the adoption of less severe manufacturing tolerances, reducing the costs of production.

Figure 6:
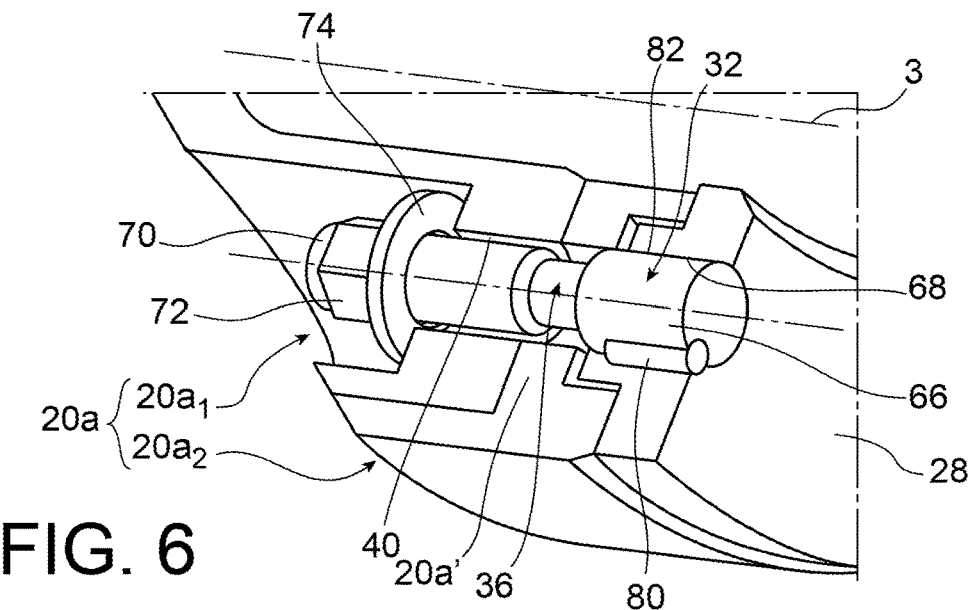
FIG. 6 is a partial and enlarged view of that shown in FIG. 3, showing more specifically the means of extraction of the cone tip.

Referring more specifically to FIG. 6, each extraction stud bolt 36 is arranged substantially axially, and passes through the attachment flange 20a' of the cone tip 20a. Each stud bolt 36 comprises a threaded rear end 66 screwed into a threaded opening 68 of the extraction block 28, and a threaded front end 70 receiving a nut 72. Moreover, a sealing washer 74 is interleaved axially between the nut 72 and the flange 20a', this washer therefore blocking in a sealing manner the passage hole 40. Here too, each nut 72 has a locking function to satisfy the constraints encountered in the vibratory environment to which it is subjected.

To ensure the blocking in rotating of each extraction stud bolt 36 extending to the rear only to the extraction block 28, a shrink-fit pin 80 is provided, oriented along a screwing axis of the stud bolt 36 and arranged at the interface 82 between the threaded rear end 66 and the threaded opening 68. This is a simple and effective technical solution allowing the two elements 28, 36 to be integral in translation in the direction of the axis 3. The shrink-fit pin 80 has a small diameter, approximately 2 mm for example.

This shrink-fit pin solution is particularly advantageous in an already strongly encumbered environment, with limited access. Moreover, it can easily be implemented on existing turbomachines.

With reference at present to FIGS. 7a to 7e, a disassembly method of the rotating front portion 1, which was just shown, will be described.

The goal of this disassembly is to have access to the protection hood 26, so as to install on it tooling for the recharging of the batteries 26 of the equipment, provided six in number for example and arranged around the axis 3.

Figure 7A:
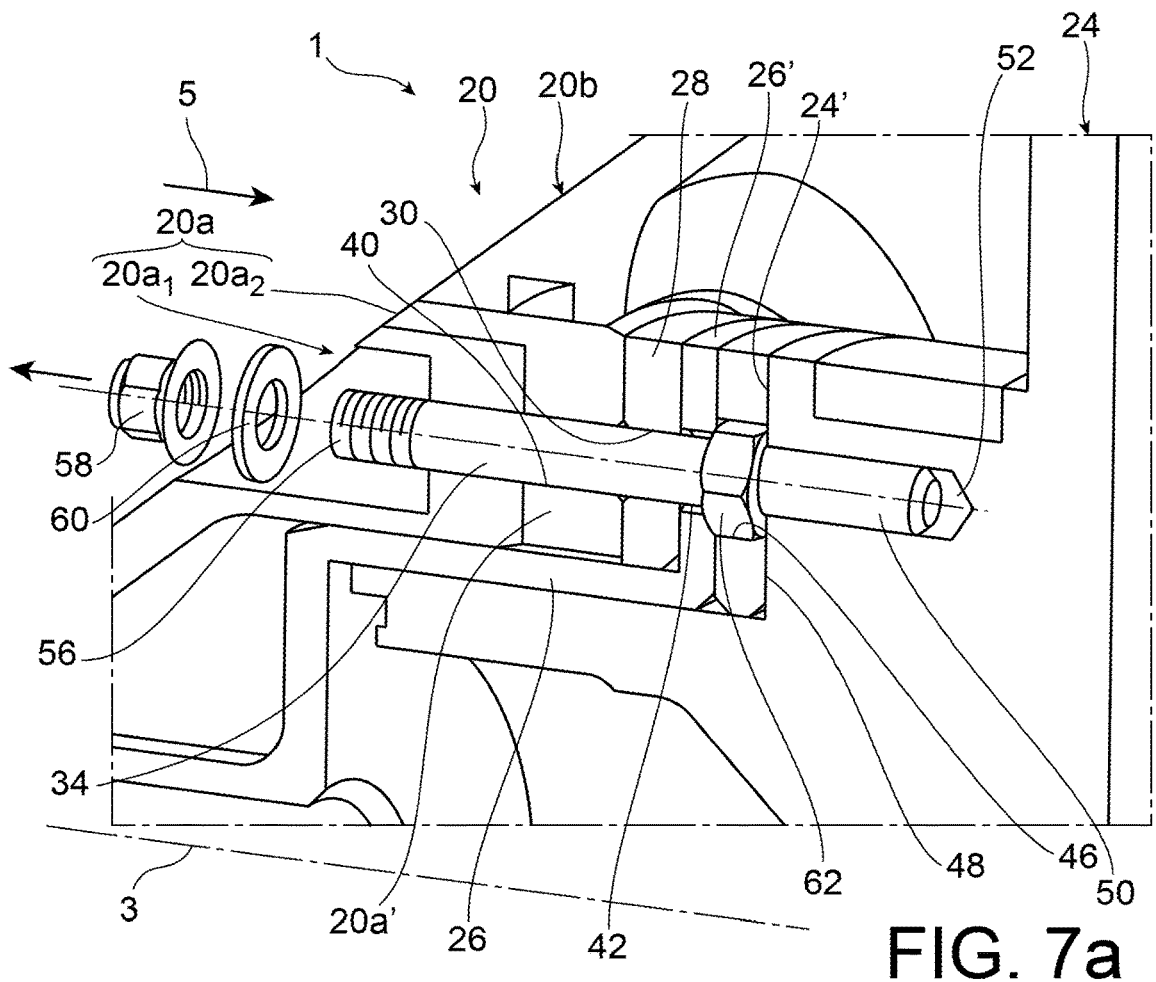
FIGS. 7a to 7e show different steps of a disassembly method for the rotation front portion shown in the preceding figures, so as to have access to a protection hood covering turbomachine equipment.

First of all, with reference to FIG. 7a, the withdrawal of the clamping nuts 58 initially present on the threaded front end 56 of the attachment stud bolts 34 is undertaken. The sealing washers 60 are also extracted from the threaded front end 56. Although this is not shown, the same type of withdrawal for the nuts 72 and the sealing washers 74, cooperating initially with the threaded front end 70 of the extraction stud bolts, is undertaken.

Figure 7B:
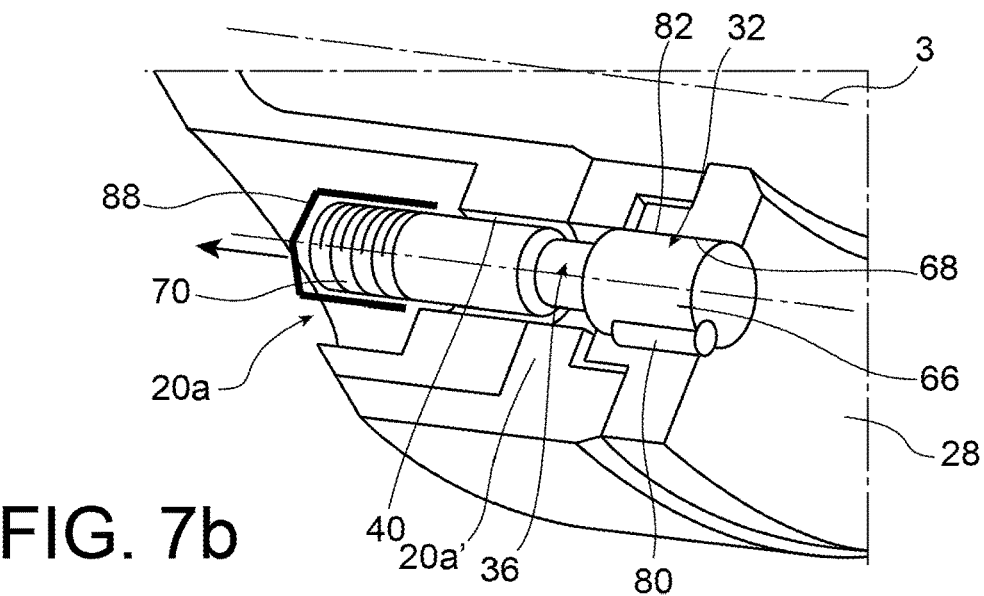

Then, as shown in FIG. 7b, a particular tooling 88 is mounted on the front end of the extraction stud bolts 36. This tooling allows these stud bolts 36 to be moved forward, along the axis 3. This movement causes simultaneously the forward translation of the extraction block 28 which, due to its axial thrust with the flange 20a' of the cone tip 20a, also drives the latter in translation forward along the axis 3. In other words, the action carried out via the tooling 88 allows the withdrawal of a removable assembly comprising the cone tip 20a, the extraction stud bolts 36 and the extraction block 28.

Figure 7C:
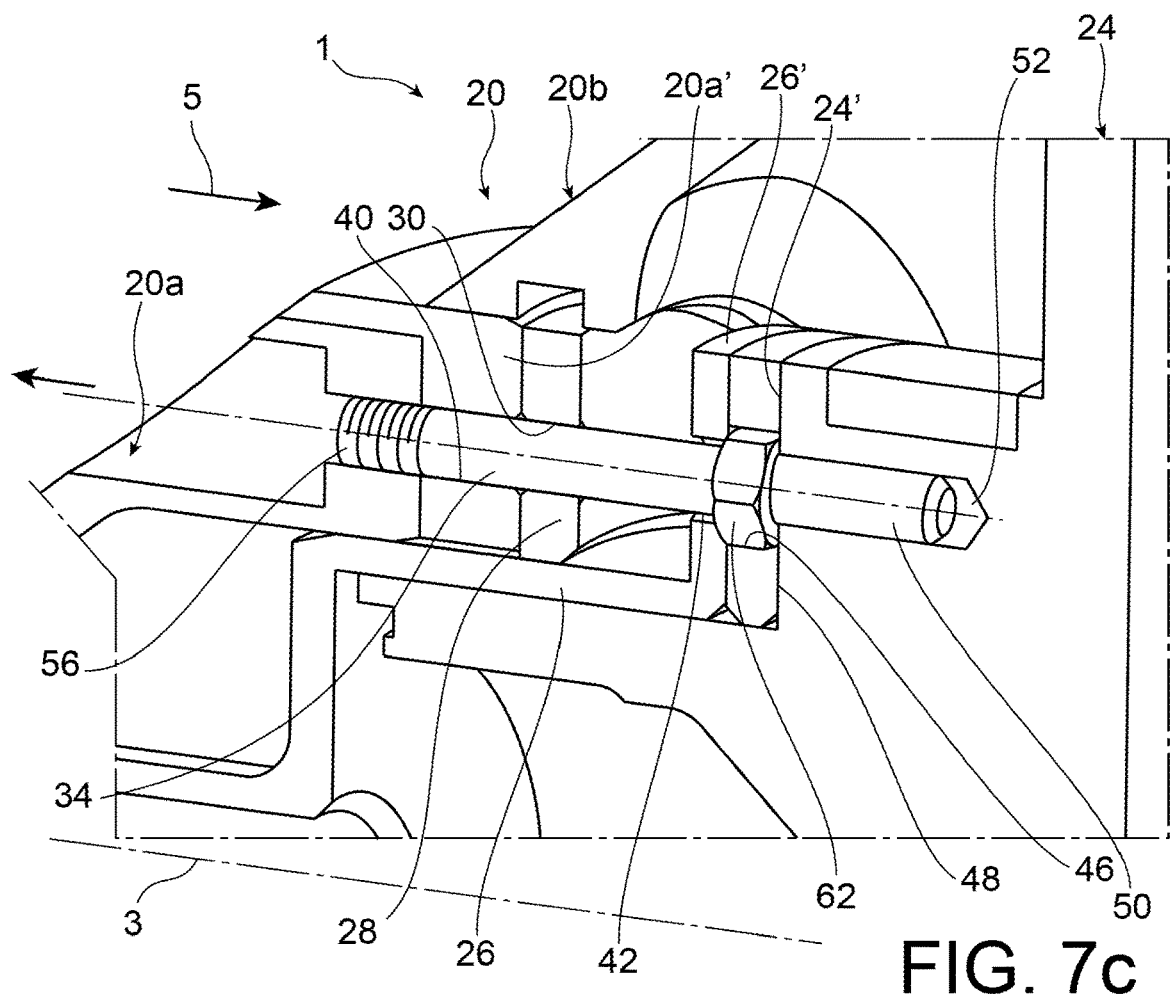

As is shown schematically in FIG. 7c, during this extraction, the attachment stud bolts 34 remain attached to the interior support 24. As a result, the attachment stud bolts 34 slide relative to the flange 20a' of the cone tip 20a as well as relative to the extraction block 28, this respectively through the passage holes 40 and 30.

Preferably, during this extraction, the protection hood 26 also remains in place, as does the ring 48.

Figure 7D:
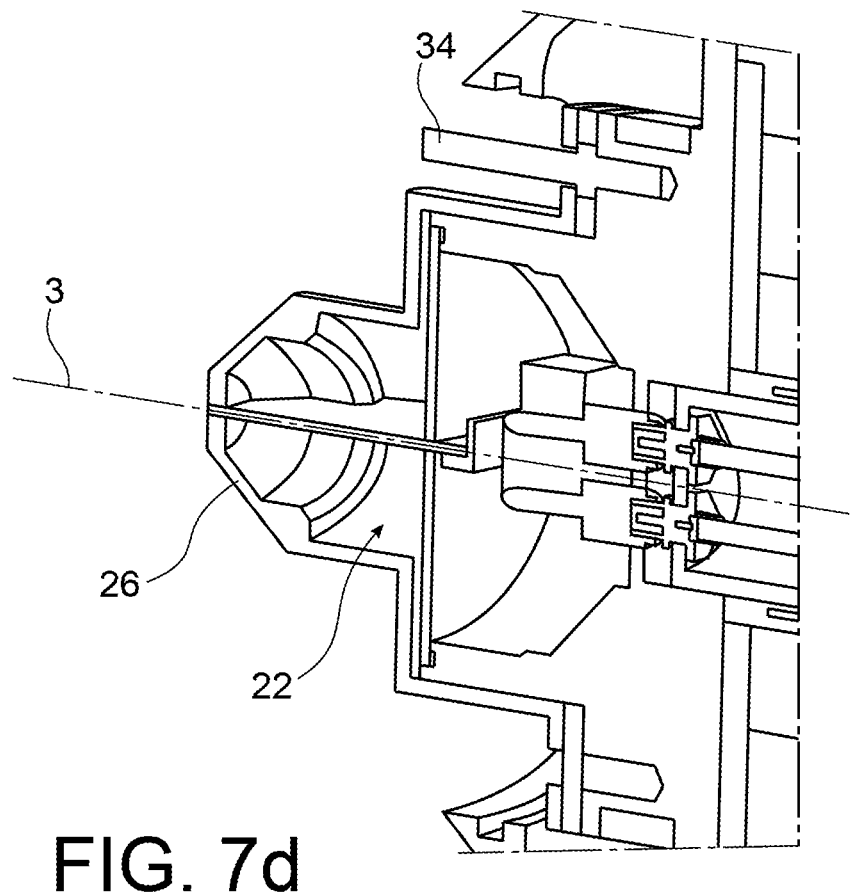
Figure 7E:
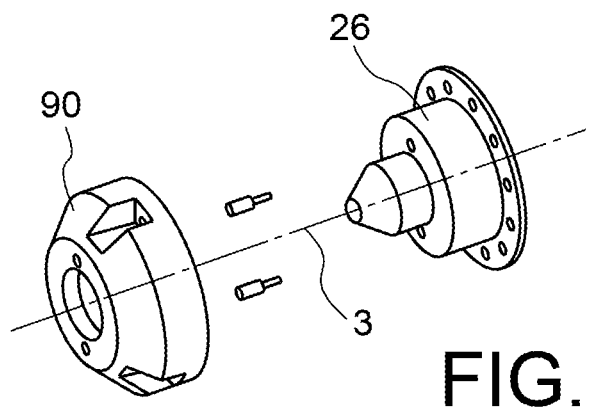

Once the removable assembly is withdrawn as shown in FIG. 7d, the front end of the protection hood 26 becomes perfectly accessible, and tooling 90 for recharging the batteries 25 can be easily assembled on this protection hood, as shown schematically in FIG. 7e.

After recharging the batteries 25, the re-assembly of the elements on the rotating front portion 1 is carried out in the reverse order of that described above for the disassembly operations.

Naturally, various modifications can be applied by a person skilled in the art to the invention which has just been described, solely by way of non-limiting examples.

What is claimed is:

1. A rotating front portion (1) of a receiver of an aircraft turbomachine comprising:
   an interior support (24);
   equipment (22) mounted on the interior support;
   a protection hood (26) covering the equipment;
   an exterior front cone (20) equipped at its front end with a cone tip (20a) covering the protection hood (26);
   an extraction block (28) interleaved between a protection hood flange (26') and a cone tip flange (20a'); and
   attachment means (34) of the cone tip (20a) to the interior support (24), said attachment means passing through the cone tip flange (20a'), the extraction block (28), and the protection hood flange (26'),
   characterized in that said attachment means comprise several attachment stud bolts (34), of which a threaded rear end (50) is screwed into said interior support (24) and of which a threaded front end (56) receives a clamping nut (58) seeking to force the cone tip flange (20a') in the direction of the interior support, said attachment means also comprising, arranged axially between the interior support (24) and the cone tip flange (20a'), a ring (48) for blocking rotation of the attachment stud bolts (34), each of the latter having an anti-rotation portion (62) with a non-circular section cooperating with a bore (46) of corresponding section of the rotation blocking ring (48),
   and in that the front portion also includes a plurality of extraction stud bolts (36), of which a threaded rear end (66) is screwed into the extraction block (28), each extraction stud bolt passing through the cone tip flange (20a'), said front portion being configured so that after withdrawal of said clamping nuts (58), a traction toward the front on the extraction stud bolts (36) allows the withdrawal of a removable assembly, comprising the cone tip (20a) and the extraction block (28), while retaining the attachment stud bolts (34) screwed to the interior support (24).

2. The rotating front portion according to claim 1, characterized in that the anti-rotation portion (62) of each attachment stud bolt (34) has a section comprising two parallel straight segments, and in that the associated bore (46) performed through the rotation blocking ring (48) has an oblong shape, of which the two parallel lateral flanks cooperate respectively with the two straight segments of the anti-rotation portion (62) of the attachment stud bolt (34).

3. The rotating front portion according to claim 2, characterized in that the anti-rotation portion (62) of each attachment stud bolt has a section of polygonal shape, preferably hexagonal.

4. The rotating front portion according to claim 2, characterized in that the attachment means include three attachment stud bolts (34), and in that the three bores (46) of oblong shape are oriented:
   for two of them, substantially tangentially with respect to an axis of rotation (3) of the front portion; and
   for the third bore, substantially radically with respect to the axis of rotation (3) of the front portion.

5. The rotating front portion according to claim 4, characterized in that the three bore (46) are arranged at 120° from one another.

6. The rotating front portion according to claim 1, characterized in that the extraction stud bolts (36) comprise a threaded front end (70) receiving a nut (72) pressing a sealing washer (74) against the cone tip flange (20a'), and in that the clamping nuts (58) screwed to the attachment stud bolts (34) also press a sealing washer (60) each against the cone tip flange (20a').

7. The rotating front portion according to claim 1, characterized in that the threaded rear end (66) of each extraction stud bolt (36) is blocked in rotation in a threaded opening (68) of the extraction block (28), by means of a shrink-fit pin (80) oriented along a screwing axis and arranged at the interface (82) between the threaded rear end (66) of the extraction stud bolt (36) and the threaded opening (68) of the extraction block (28).

8. The rotating front portion according to claim 1, characterized in that the equipment (22) covered by the protection hood (26) and mounted on the interior support (24) corresponds to a transmitting antenna of a telemetry device (23) also equipped with at least one battery (25).

9. An aircraft turbomachine (10) comprising a receiver (2) of which the rotating front portion (1) appears according to claim 1, the receiver preferably being a fan.

10. A disassembly method of the rotating front portion (1) according to claim 1, said method aiming to provide access to the protection hood (26) covering the equipment (22) and comprising the following step:

withdrawal of the clamping nuts (58) present on the threaded front end (56) of the attachment stud bolts (34); then forward displacement of the extraction stud bolts (36) so as to withdraw the assembly comprising the cone tip (20*a*) and the extraction block (28), a withdrawal during which the attachment stud bolts (34), which remain attached to said interior support (24), slide relative to the cone tip flange (20*a'*) and to the extraction block (28).

\* \* \* \* \*